Oct. 27, 1936.                J. F. TRITLE ET AL                2,059,064
                                PROTECTIVE SYSTEM
                                Filed July 29, 1932
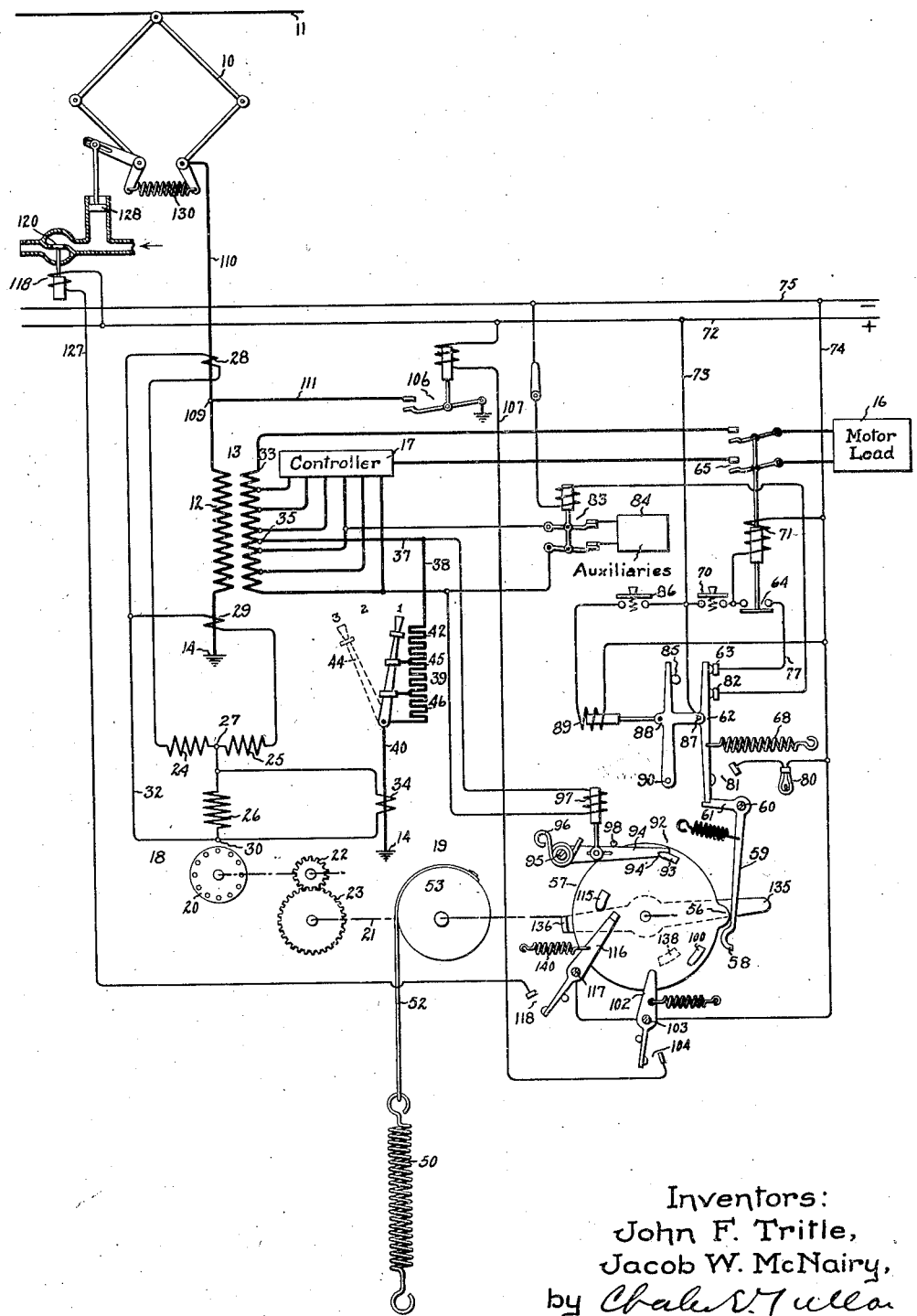
Inventors:
John F. Tritle,
Jacob W. McNairy,
by Chas. W. Tullar
Their Attorney.

Patented Oct. 27, 1936

2,059,064

UNITED STATES PATENT OFFICE 2,059,064

PROTECTIVE SYSTEM

John F. Tritle and Jacob W. McNairy, Erie, Pa., assignors to General Electric Company, a corporation of New York Application July 29, 1932, Serial No. 626,073

16 Claims. (Cl. 191—8)

Our invention relates to protective systems for alternating current railway traction drives, more particularly to the provision of a protective relay system responsive to overload and fault current flow, and has for an object the provision of a simple and reliable protective system providing great flexibility of operation.

In railway systems of the alternating current type a load transformer has its primary coil connected to a pantograph and to ground, while from the secondary coil there are connected load and auxiliary power supply circuits. The necessity for protection of the system against overload and against grounds or other fault conditions of a similar nature is well recognized by those skilled in the art. Heretofore, separate relays have been designed for operation in response to the abnormal conditions which sometimes arise during the operation of a locomotive. The use of a separate relay for each abnormal condition, however, complicates the wiring and leaves something to be desired in the selectivity of operation of the relays and in the flexibility of the system.

In carrying out our invention in one form thereof, we obtain overload and ground protection of the system by means of a single relay. More specifically, we provide relay operating means provided with a stator field winding, which is energized in accordance with the load current flowing to and from the primary coil of the power transformer, and with a second stator winding, energized in accordance with the difference between the current flowing into and the current flowing out of the primary coil of the power transformer. Each winding is arranged to operate the relay independently of the other in response to a predetermined current flow. The second winding is also arranged to be energized to operate the relay in response to ground fault current flowing from a grounded mid-tap on the power transformer secondary coil to ground. The relay is suitably biased against a latch, which latch under the influence of a transformer-voltage responsive coil prevents reverse operation of the relay as long as there is voltage on the transformer. By providing the relay with a plurality of properly connected contacts we accomplish protection of the system against overload, against grounds or short circuits, and against ground or short circuits which result in grounds in the transformer secondary coil. The usual sequence of operation initiated by the operation of the relay is as follows: All power circuits internal to the locomotive comprising the motor load and the auxiliaries are first deenergized. If the abnormal condition continues the pantograph is connected directly to ground though the relay continues to be energized. The grounding of the pantograph causes the substation circuit breakers to open to deenergize the trolley and the power transformer. The relay then operates to lower the pantograph thereby removing the faulty locomotive from the system. The pantograph cannot be raised to connect the locomotive to the trolley until the relay has been manually reset.

For a more complete understanding of our invention reference should now be had to the accompanying drawing in which we have diagrammatically illustrated our invention as applied to a railway locomotive.

It is believed that a clear understanding of the arrangement and operation of the various parts of the system will be best understood from a complete description of the operation of the system as a whole and therefore the construction and arrangement of certain of the devices only will be first described in detail.

Referring to the drawing, we have shown our invention in one form as applied to a locomotive having a pantograph 10 arranged to conduct current from a trolley 11 through the primary coil 12 of a power transformer 13. The return circuit of the primary coil 12 is indicated by the ground connection 14. The magnitude of the voltage applied to the electric motors represented by motor load 16 is controlled by means of a controller 17 which may be of any suitable type of which there are many known to the art.

Though other types of motors may be used, for example a repulsion motor, the operating element 18 of the protective relay 19 preferably consists of a shaded pole, split phase induction motor. The rotor 20 of the operating element 18 is connected to a relay operating shaft 21 by means of the reduction gearing 22 and 23. As shown, two stator coils 24, 25 and a winding 26 are provided on the motor. The stator of the operating element 18 is provided with two poles about which are respectively mounted the coils 24 and 25 forming the overload protective winding 24—25. These coils are connected in a closed series circuit which includes a current transformer 28 responsive to the current entering the transformer primary coil 12 and a current transformer 29 responsive to the current leaving the transformer primary coil, the said current transformers being connected in series accumulative relation with respect to each other. Whenever a current of predetermined magnitude flows through the series circuit, the coils 24 and 25 cause rotation of the rotor 20 in a counter-clockwise direction to operate the relay 19.

The winding 26, which may consist of one or more coils as in the case of the overload winding, is arranged about the stator poles to cause rotation of the rotor 20 and the operation of the relay upon a predetermined energization thereof. This winding 26 is connected at 27 between the coils 24 and 25 and at 30 to a conductor 32 forming a part of the closed series circuit traced above. By connecting the winding 26 in this manner, it is energized by the current transformers in response to the difference between the current entering and the current leaving the transformer primary coil 12. For example, if a ground fault occurs in the primary coil 13 it will be seen that less current will flow through the current transformer 29 than flows through 28 inasmuch as the additional return circuit by way of the ground fault provides an easier path for the current to return to the source of supply than through the ground connection 14. Current will then flow from the current transformer 28 through the coil 26 and the coil 24. A ground protective circuit is thereby provided by means of which the relay is operated. The winding 26 is provided with a substantially larger number of turns than the coil 24 so that the winding 26 produces a greater torque on the rotor 20 than the coil 24 for equal values of current. The coil 24 is preferably connected in cumulative relation with respect to the winding 26 so that it assists this winding during the differential operation. Since the winding 26 has the larger number of turns the relay can be operated by fault current even though the coil 24 is differentially connected with respect to the winding 26.

The winding 26 also serves to operate the relay upon the occurrence of grounds or short circuits, or against grounds or short circuits which result in grounds in the transformer secondary coil 33. This result is accomplished by connecting the winding 26 to a current transformer 34 responsive to the current flow in a normally grounded circuit provided for the transformer secondary coil. This circuit may be traced from substantially the mid-portion 35 of the secondary coil 33 by conductors 37 and 38, a variable resistor 39 and by conductor 40 to ground 14. As shown, only a section 42 of the resistance 39 is included in the normal transformer-secondary ground circuit. The value of the resistance section 42 is selected so that a ground one tap away from the mid-portion 35 of the transformer secondary coil will cause operation of the relay. By operating a resistance shunting switch 44 sections 45 and 46 of the resistance 39 are successively included in the ground circuit. The resistance section 45 prevents operation of the relay due to the current transformer 34 except on abnormally excessive transformer secondary ground faults, while the section 46 limits the current flow through the current transformer 34 so that the relay 19 is not operated though grounds exist in the transformer secondary 33.

It will be observed that the rotor 20 when energized for rotation in the counter-clockwise direction by either of its windings is opposed by a tension spring 50 attached by a chain 52 to a cam 53 secured to the relay operating shaft 21. The cam 53 is formed so that the torque on the shaft due to the spring is maintained substantially constant or decreases slightly so that after the relay starts to operate it will continue to travel so long as the original tripping current is maintained. As shown, this is accomplished by mounting the cam off center so that the radius to the point of contact with the chain 52 decreases as the relay rotates. As soon as the shaft 21 is rotated a slight amount in the clockwise direction, a cam 56, secured to a disk 57 carried by the shaft 21, strikes one end 58 of a lever 59. This lever is pivoted at 60 and its upper end 61 forms a latch for a tripping arm or member 62 of a trip-free switch 63. The switch 63 in cooperation with the interlock contacts 64 operated with the circuit breaker 65 normally maintains a holding circuit for the circuit breaker. However, when the cam 56 engages the lower end 58 of the lever 59, the switch 63 by means of a tension spring 68 is operated to its open position to interrupt the circuit breaker holding circuit.

It is now believed that a comprehensive understanding of the invention, including the construction and arrangement of the various apparatus as well as its operation will be facilitated by a description of the operation of the system as a whole.

In the operation of our invention the circuit breaker 65 is closed by means of a push button switch 70 which closes an energizing circuit for the operating coil 71 of the circuit breaker 65. This circuit may be traced from the supply line 72 by conductor 63, push button station 70, operating coil 71, and by conductor 74 to the other supply line 75. Consequently to the closing of the circuit breaker a holding circuit for its operating coil 71 may be traced from the supply line 72 by conductor 73, switch 63, conductor 77, contacts 64, operating coil 71 and by conductor 74 to the other supply line 75.

The locomotive is now accelerated by the operation of the controller 17. The controller, as is well understood in the art, serves to vary the connections of the secondary 33 of the transformer 13 so as to control the voltage applied to the motors. If an excessive load current is taken by the motors the secondary current from the series connected current transformers 28 and 29 flowing through the windings 24 and 25 of the relay will be sufficient to cause the rotor 20 to be rotated in a counter-clockwise direction. As we have already explained, the cam 56 thereupon trips the switch 63 which opens the holding circuit to the circuit breaker 65. A signal light 80 located in the cab of the locomotive is energized by contacts 81 on the switch 63 to inform the engineer that the relay has tripped out the circuit breaker. Besides deenergizing the motor load 16, the switch 63 by means of contacts 82 at the same time deenergizes a contactor 83. The opening of this contactor deenergizes the auxiliaries 84 so that all internal power circuits of the locomotive are deenergized. The auxiliaries include the blower motor, compressor motor, etc. The result of the tripping of the switch 63 causes the tripping arm 62 to come to rest against a stop 85.

By depressing the push button 86 the switch 63 may be reset. It will be seen that the tripping arm 62 of the switch 63 is pivotally connected at 87 to a member 88 which is rotated by the solenoid 89 about its pivot 90. As the solenoid rotates the member 88 about its pivot 90, the stop 85 acts as a fulcrum about which the member 62 is rotated until the latch 61 secures the lower end of the member 62 in its original position. As soon as the push button is released to deenergize the solenoid 89, the spring 68 rotates the member 62 about the latch 61 to close the switch 63. By providing the trip-free arrangement described it is not possible for the operator to maintain a holding circuit for the circuit breaker 65 or for the contactor 83. In other words, the operation of the switch 63 is substantially independent of the operator. The push button 86 may be used as a stop button. For example, if the push button 86 is depressed when the switch 52 is in its closed circuit position the solenoid 89 will operate the switch 63 to its open position which in turn trips the breakers 65 and 83. As soon as the push button 86 is released the switch 63 will be returned to its closed position. To reclose the circuit breaker, it is again necessary to operate the push button 70.

Continuing with the description, as soon as the circuit breaker 65 deenergizes the motors 16 the tension spring 50 returns the relay to its original position. The original position, as shown in the drawing, is determined by means of a stop 92 formed by a projection 93 on the disk 57 and the notched end 94' of a lever 94. The lever 94 is pivoted at 95 and is biased downwardly by a spring 96. A voltage release coil 97 normally energized from the secondary winding 33 of the transformer 13 opposes the bias of the spring 96 to maintain the lever 94 against a stop 98 so that the projection 93 always strikes the lever 94 unless the coil 97 has been deenergized. Thus it will be seen that under predetermined conditions, the voltage responsive coil 97 and the biasing spring 50 cooperate automatically to reset the relay.

It will now be assumed that there is a ground fault in the primary winding 12 of the transformer, that the relay has started to operate and that the switch 63 has been tripped to deenergize the internal power supply circuits. As a result of this short circuit, more current flows through the current transformer 28 than through the transformer 29 because a portion, or all, of the current taken from the trolley 11 returns through the ground in the primary winding. The resultant current through the winding 26 as well as the currents in coils 24 and 25 will energize the relay so that the disk 57 will continue to be rotated in the clockwise direction. A projection 100 secured to the disk 57 after an interval of time, engages a lever 102 to rotate it about its pivot point 103 thereby to close the contacts 104. Consequent to the closing of the contacts 104 an energizing circuit for a grounding switch 106 may be traced from the supply line 72, operating coil of the grounding switch 106, conductor 107, contacts 104 and by conductor 74 to the other supply line 75. As a result of the closing of the grounding switch 106 a grounding circuit is completed at a point 109 on the trolley lead-in conductor 110. The result of grounding the trolley 11 is to cause the sub-station circuit breakers to be tripped, thereby deenergizing the trolley. By grounding the trolley below the current transformer 28, as indicated at 109, additional protection of the apparatus is secured in case the substation breakers do not immediately deenergize the trolley. This will be clear by observing that when the grounding switch 106 closes, a current of great magnitude flows from the trolley 11, by pantograph 10, conductors 110 and 111, and by grounding switch 106, to ground. Since the current transformer 28 is responsive to the current flowing in the conductor 110 the relay will be held in its operation position with the contacts 104 closed. The relay, therefore, functions to avoid the possibility of the lowering of the pantograph while the large current is flowing to ground. The pantograph and the trolley are thereby protected against damage which would inevitably occur if the pantograph were lowered during the flow of the abnormally high current. It will also be observed that as soon as the grounding switch 106 is operated to its closed position the potential coil 97 is deenergized and the latch 92 is operated in a clockwise direction by the spring 96.

It will now be assumed that the substation breakers have opened to deenergize the trolley 11. The spring 50 thereupon rotates the disk 57 in a counterclockwise direction or towards its original position. Under the conditions assumed, the disk 57 continues its counterclockwise rotation beyond the position shown in the drawing because the stop 92 is no longer effective in arresting its movement. The continued movement of the disk 57 rotates a projection 115 into engagement with a lever 116 pivoted at 117. The rotation of the lever 116 closes the contacts 118 to complete an energizing circuit for the operating coil 119 of a valve 120. This circuit may be traced from the supply line 72, operating coil 119, conductor 127, contacts 118 and by conductor 74 to the other supply line 75. The opening of the valve 120 releases the air pressure normally exerted against piston 128 so that the pantograph 10 is lowered under the influence of the tension spring 130. The pantograph 10, it will now be seen, cannot be lowered unless the stator windings of the relay and the voltage coil 97 are deenergized. Therefore, no arcing occurs between the pantograph 10 and the trolley 11 as the pantograph is lowered.

The relay is now latched into position with the contacts 118 closed. The latching is accomplished by designing the lengths of members 94 and 116 so that as the member 116 is rotated to close the contacts 118 the notched end 94' positively latches the contacts closed. Before the pantograph 10 may be raised, it is necessary to reset the relay 19 manually. A reset lever 135 is freely mounted on the shaft 21 and is provided with an extension 136 which is arranged to engage the lever 94 when the reset arm 135 is rotated in a clockwise direction. The projection 136 raises the lever 94 to its original position and by means of a rearwardly extending extension 138 secured to the disk 57 the reset arm 135 also rotates the disk 57 in a clockwise direction until the projection 93 again reaches a position to be engaged by the notched end 94' of member 94. As the relay is reset the contacts 118 are opened by a tension spring 140 and the relay is now in readiness for further operation.

It will be assumed that a fault occurs on the locomotive of sufficient magnitude to operate the substation breakers in one-half cycle. The relay in response to a fault of such magnitude receives an impulse sufficient to cause the disk 57 to be rotated a slight amount in a clockwise direction. The opening of the substation breakers, of course, deenergizes the trolley 11 so that the potential coil 97 is also deenergized. Consequently, the member 94 under the influence of the spring 96 is rotated out of engagement with the projection 93. The torque impulse which operated the relay an amount sufficient for the relay to unlatch itself immediately disappears and the relay in response to the torque exerted by the spring 50 closes the contacts 118 to lower the pantograph 10. That the relay will unlatch itself on the occurrence of a fault of substantially one-half cycle duration has been verified in actual practice. If the relay did not lower the pantograph, the defective locomotive would remain connected to the trolley so that the trolley could not be reenergized by the closing of the substation circuit breakers.

By providing the circuit from the mid-portion 35 of the transformer secondary winding 33 to ground, the relay is operated in response to ground faults in the transformer secondary or in case of a ground or short circuit which results in a ground in the secondary winding or in case of a ground in the auxiliary circuits of the locomotive. As we have stated, the auxiliary circuits are ordinarily provided for feeding auxiliaries such as blowers, compressors, heaters and the like. As shown, the energization of the auxiliaries 84 is controlled by the contactor 83 which in turn is operated by the relay 19.

Assuming now that a ground occurs in the transformer secondary coil 33 one tap from the grounded mid-portion 35. Current will then flow by conductors 35, 37 and 38, resistance section 42, conductor 40 and by ground 14 to the grounded coil of the transformer. The current transformer 34 produces a voltage on the relay winding 26 proportional to the current in the conductors 40 and for the conditions assumed is of great enough magnitude to operate the relay. The switch 63 is opened to deenergize the contactor 83 by the opening of the contacts 82 operated with the switch 63. The auxiliaries may again be energized by resetting the switch 63 in the manner described above.

Under some conditions of operation it is desirable to continue the operation of the locomotive even though a ground exists in the transformer secondary coil or in an auxiliary. The locomotive operation is rendered substantially independent of secondary faults by operating the cut-out swith 44 to position 2. The resistance section 45 is thereby included in the circuit to ground by way of conductor 40 and limits the current flow to such a degree that the current transformer 34 only causes operation of the relay in response to fault current of relatively great magnitude.

The operation of the relay 19 is rendered entirely independent of the current transformer 34 by operating the switch 44 to position 3 so that the entire resistance 39 is effective in limiting the current through the transformer 34. By increasing the resistance of the transformer ground current instead of opening the circuit, a leakage path is maintained for the transformer secondary coil. The leakage circuit consequently avoids the building up of static potentials in the event that the fault is accidentally removed without the knowledge of the operator.

While we have shown a particular embodiment of our invention, it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent of the United States, is:

1. In combination, a transformer having primary and secondary coils for supplying power to a load circuit, a relay provided with an overload operating winding for controlling the energization of said load circuit, and current transformers respectively responsive to the current entering and the current leaving said primary coil connected in series accumulative relation with said winding for operating said relay to deenergize said load circuit upon the occurrence of an overload current of predetermined magnitude.

2. In combination, a transformer having primary and secondary coils for supplying power to a load circuit, a relay provided with an overload winding for controlling the energization of said load circuit, current transformers respectively responsive to the current entering and the current leaving said primary coil connected in series accumulative relation with said winding for operating said relay, a second winding for operating said relay, and connections for connecting said second winding for energization in response to the difference between the current entering and the current leaving said primary transformer coil.

3. In combination, electrical energy converting means having a coil, a relay for controlling the energization of said coil, an overload winding for operating said relay, a pair of current transformers for energizing said overload winding in response to the current entering and the current leaving said coil, a second operating winding for said relay, and means including said current transformers for energizing said second winding in response to the difference between the current entering and the current leaving said coil.

4. In combination, a transformer having primary and secondary coils for supplying power through a circuit controlling means, means for protecting said transformer upon the occurrence of ground, short circuit, or overload conditions comprising a winding energized in response to the current entering and leaving said primary coil, a second winding responsive to the difference between the current entering and the current leaving said primary coil, and means responsive to both of said windings for controlling said circuit controlling means.

5. In combination, a transformer having primary and secondary coils for supplying power to a load circuit, circuit controlling means connected between said secondary coil and said load circuit, means for protecting said transformer and said circuit upon the occurrence of ground, short circuit, or overload conditions comprising a winding energized in response to the current entering and leaving said primary coil, a second winding responsive to the difference between the current entering and the current leaving said primary coil, and means responsive to the energization of both of said windings for operating said circuit controlling means.

6. In combination, an alternating current traction drive including a transformer having primary and secondary coils, an overload and ground protective relay comprising a split phase shaded pole induction motor, a winding on the stator of said motor, means for energizing said winding in response to the load current entering said primary coil and to the load current leaving the primary coil of said transformer, a second winding on the stator of said motor, and connections for connecting said second winding in a circuit with said first winding for operating said relay upon the occurrence of a predetermined difference between the current entering and the current leaving said primary coil.

7. In combination, a power transformer having primary and secondary coils for supplying power to a load circuit, a relay for controlling the energization of said load circuit, an overload winding for operating said relay, means including a pair of current transformers for energizing said overload winding in response to the current entering and the current leaving said transformer primary coil; a second winding for operating said relay, means including said current transformers for energizing said second winding in response to the difference between the current entering and the current leaving said primary coil, a circuit extending from substantially the mid-portion of said transformer secondary coil to ground, and a current transformer responsive to the current flowing in said last mentioned circuit for energizing said second relay winding whereby said transformer is protected against overload and against grounds in either its primary or secondary windings.

8. In combination with a traction drive for a locomotive provided with a pantograph and a motor load, of an overload and ground protective relay, means responsive to predetermined overload current flow for rotating said relay a predetermined amount, circuit controlling contacts operable by said predetermined rotation of said relay for deenergizing said motor load, means responsive to a predetermined ground current flow for further rotating said relay beyond said predetermined amount, and additional contacts on said relay operable by said further rotation of said relay for completing connections from said pantograph to ground.

9. The combination with an alternating current motor control system for a locomotive provided with a pantograph, a transformer having primary and secondary coils, and a motor load, of a circuit breaker for connecting said motor load to said secondary coil, a protective relay including contacts for controlling the energization of said circuit breaker, means responsive to a predetermined motor load for operating said relay to open said contacts, manually controlled means operable to a predetermined position to prepare said contacts for reclosure and for effecting their reclosure after said manually controlled means has been released.

10. The combination with an alternating current motor control system for a locomotive provided with a pantograph, a transformer having primary and secondary coils and a motor load, and a circuit breaker for connecting said motor load to said secondary coil, of a protective relay for said system having an operating element comprising a split phase, shaded pole induction motro, a winding on the stator of said motor energized in response to the load current entering and leaving said primary coil, a second winding on said stator responsive to the difference between the current entering and leaving said transformer primary coil, the said windings being arranged to cause rotation of said relay in one direction, biasing means normally biasing said relay for rotation in the reverse direction, a latch, and a voltage responsive coil for holding said latch in a position to prevent rotation of said relay in said reverse direction beyond a predetermined position.

11. The combination with an alternating current motor control system for a locomotive provided with a pantograph, a transformer having primary and secondary coils, and a motor load, of a circuit breaker for connecting said motor load to said secondary coil, a protective relay for said system having an operating element comprising a split phase, shaded pole induction motor, a winding on the stator of said motor responsive to a predetermined load current entering and leaving said primary coil for causing rotation of said motor in a forward direction, a second winding on said stator responsive to differences in current flowing to and from said transformer primary coil for causing rotation of said motor in the forward direction, contacts responsive to a predetermined rotation of said motor for deenergizing said circuit breaker, a grounding switch for said pantograph, and a second pair of contacts arranged to be closed in response to additional rotation of said motor for operating said grounding switch to ground said pantograph.

12. The combination with an alternating current motor control system for a locomotive provided with a pantograph, a transformer having primary and secondary coils, and a motor load, of a circuit breaker for connecting said motor load to said secondary coil, a protective relay for said system having an operating element comprising a split phase, shaded pole induction motor, a winding on the stator of said motor responsive to a predetermined load current entering and leaving said primary coil for causing rotation of said motor in a forward direction, a second winding on said stator responsive to differences in current flowing to and from said transformer primary coil for causing rotation of said motor in a forward direction, contacts responsive to a predetermined rotation of said motor for deenergizing said circuit breaker, a grounding switch for said pantograph, a second pair of contacts arranged to be closed in response to additional rotation of said motor for operating said grounding switch to ground said pantograph, the said windings being arranged to maintain said second pair of contacts closed so long as current flows from said trolley to said grounding switch and to ground.

13. In combination, an electric locomotive, an alternating current motor control system therefor including a transformer having primary and secondary coils, a motor load, a circuit breaker connected between said secondary coil and said load, auxiliaries for said locomotive connected to said secondary coil, a ground circuit for said secondary coil, resistance means for controlling the current flow in said circuit, a protective relay, current responsive means responsive to a predetermined current flow in said ground circuit for operating said relay, and means responsive to the operation of said relay for deenergizing said auxiliaries, and means for adjusting said resistance means to limit the current flow in said ground circuit sufficiently to prevent operation of said relay by said current responsive means.

14. In combination, an electric locomotive, an alternating current motor control system therefor including a transformer having primary and secondary coils, a motor load, a circuit breaker connected between said secondary coil and said load, auxiliaries for said locomotive connected to said secondary, a ground circuit for said secondary, resistance means for controlling the current flow in said circuit, a protective relay, means responsive to a predetermined current flow in said circuit for operating said relay, means responsive to the operation of said relay for deenergizing said auxiliaries and said motor load, and means for adjusting at will said resistance means so as to vary the current required in said ground circuit for the operation of said relay whereby said locomotive can be operated even though current flows in said ground circuit.

15. The combination with an alternating current motor control system for a locomotive provided with a pantograph, a transformer having primary and secondary coils and a motor load, of a circuit breaker for connecting said motor load to said secondary coil, a protective relay for said system having an operating element provided with a stator and a rotor, an overload winding on said stator responsive to the load current entering and leaving said primary coil, a second operating winding on said stator responsive to the difference between the currents entering and leaving said primary coil, a predetermined energization of either of said windings causing rotation of said rotor in a forward direction, biasing means normally biasing said relay for rotation in the reverse direction, a latch, a voltage responsive coil for holding said latch in a position to prevent rotation of said relay in said reverse direction beyond a predetermined position, tripfree contacts operated by a predetermined rotation of said relay in the forward direction to deenergize said circuit breaker, a second pair of contacts, means responsive to a predetermined additional rotation of said relay in the forward direction for closing said second pair of contacts, a grounding switch for said pantograph, means responsive to the closing of said second pair of contacts for closing said grounding switch to deenergize said transformer and said voltage responsive coil, a third pair of contacts on said relay arranged to be closed by a predetermined rotation of said relay in the reverse direction beyond said predetermined position, operating means responsive to the closing of said third pair of contacts for lowering said pantograph, said latch cooperating with one of said contacts for preventing further movement of said relay, and manual means for resetting said relay.

16. In a protective relay system, in combination, electrical apparatus, a pantograph collector for connecting said apparatus to a power conductor, means for grounding the pantograph, means for lowering the pantograph to disconnect the apparatus from the power conductor, relay means responsive to abnormal current conditions in said apparatus for causing the operation of said grounding means and said pantograph lowering means in sequential relation, and means associated with said relay means and responsive to voltage conditions in said apparatus for causing the relay to be automatically reset under predetermined conditions.

JOHN F. TRITLE.
JACOB W. McNAIRY.